3,328,133
METHOD FOR DIRECT RECOVERY OF PLUTONIUM FROM IRRADIATED NUCLEAR FUEL

Takehiko Ishihara, Mito-shi, and Takeshi Tsujino, Tokai-mura, Naka-gun, Ibaraki-ken, Japan, assignors to Japan Atomic Energy Research Institute, Tokyo, Japan
No Drawing. Filed June 1, 1964, Ser. No. 371,773
Claims priority, application Japan, Feb. 10, 1964, 39/6,640
1 Claim. (Cl. 23—340)

This invention relates to a method which, in the reprocessing of irradiated nuclear fuel, comprises extracting plutonium directly with amine nitrate without dissolving the fuel, and recovering the plutonium as a precipitate.

In general, nuclear fuel is pulverized and activated by repeating oxidation-reduction; for example, uranium compounds are converted to $U_3O_8$ by oxidation with oxygen and then to $UO_2$ by reduction with hydrogen, and, because of the difference in crystal structure between $U_3O_8$ and $UO_2$, repetition of these steps results in the smashing and pulverizing of said compound. Further, though $UO_2$ in pellet form is hardly soluble in nitric acid, $UO_2$ which has been pulverized through the said treatment is easily soluble in nitric acid.

Further, in the extraction with a tertiary amine from an aqueous solution of nitric acid, the distribution ratio ($Kd$) of plutonium is 10~100, which shows high selectivity for plutonium, while the $Kd$ of uranium is 0.1~0.2 and the $Kd$ of fission products is as low as 0.0001~0.01, and, even in the coexistence of 1 M of uranium, the $Kd$ of plutonium is the value of 10 which is convenient for direct recovery of plutonium. Also, in the case of extraction with TBP, disadvantages such as loss of uranium and plutonium and decreasing of decontamination factor result by radiation damage to TBP in contrast, when alkylamine is used, very little unfavorable influence is observed upon the extraction, even under their radiation of $10^8$ r., and the alkylamine endures for a long time, even though exposed to high radiation.

Also, the complex agent such as oxalic acid forms a precipitate with plutonium readily in accordance with the following equation.

$$Pu^{+4}+2(COOH)_2 \rightleftarrows (COO)_4Pu+4H^+$$

This invention takes advantage of the above-mentioned special properties and experimental facts in respect of alkylamine, and, by effecting consolidation and combination thereof, creates a novel reprocessing method.

This invention relates to a method which comprises first eliminating part of the fission products from irradiated nuclear fuel by repeating the steps of oxidation by oxygen and reduction by hydrogen, simultaneously pulverizing and activating the fuel in order to make the subsequent direct extraction easy, then effecting leaching in respect of the pulverized fuel with a tertiary amine nitrate liquid (kerosene-diluted and octyl alcohol-added) such as tri-octylamine (TOA), trilaurylamine (TLA) and cyclo-hexyldilaurylamine (CHDLA) with which nitric acid has been reacted in advance, thereby leaching the plutonium in the nuclear fuel selectively into the amine phase, and, leaving uranium and fission products in the residue, separating the plutonium alone, and, further, treating this plutonium-holding amine phase with an aqueous solution containing a complex agent such as oxalic acid, thereby precipitating and recovering the plutonium directly from the amine phase.

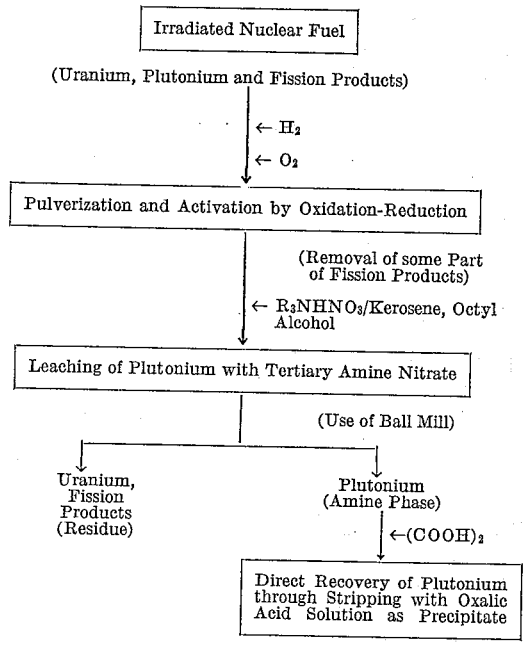

It is presumed that the mechanism of extraction and stripping in this process proceed as follows:

$$R_3N+HNO_3 \rightleftarrows R_3NHNO_3$$
$$PuO_2+4HNO_3 \rightleftarrows Pu(NO_3)_4+2H_2O$$
$$Pu(NO_3)_4+2NO_3^- \rightleftarrows Pu(NO_3)_6^{--}$$
$$2R_3NHNO_3+Pu(NO_3)_6^{--} \rightleftarrows 2R_3NHPu(NO_3)_6+2NO_3^-$$

Upon leaching, dissolution of plutonium with nitric acid occurs as shown in the above equation and then the extraction begins; accordingly, in order to maintain a high extraction rate, it is necessary to pulverize the fuel further with a ball mill or the like to keep the surface of the powdered fuel always fresh.

The conventional method for separation and recovery of plutonium from irradiated fuel, which comprises first dissolving the irradiated fuel in nitric acid, then repeating liquid-liquid extraction wth TBP/kerosene to separate uranium, plutonium and fission products, precipitating the plutonium or condensing it by evaporation, thereafter effecting liquid-liquid extraction again, and finally purifying it by means of ion exchange, was defective in that the procedures are complicated, that radiation damage to the solvent brings unfavorable influence upon the extraction, that a large quantity of radioactive wastes result, and others.

In contrast to the above, the method of this invention has numerous advantages, as follows: it makes feasible the easy and direct recovery of plutonium of high purity through a simple process which requires no acid dissolving stage; the use of small-scale remote control facilities is practicable because the highly radioactive materials can be treated together in small volume; an amine which is little influenced by radiation is used; the amount of acid required is small; and, lastly, the quantity of wastes is extremely small.

Furthermore, this invention is applicable not only to the separation of plutonium from irradiated uranium fuel, but also to plutonium fuels in the form of metals, oxides, carbides, etc., the fuels which are expected to be used in the future.

*Example 1*

A 1 g. of $UO_2$ pellet, which was hardly soluble in nitric acid, after being irradiated in the reactor to the flux of $5 \times 10^{17}$ n./cm.$^2$ and then cooled for 65 days, was put in a quartz boat and, by heating to 400° C. in an oxygen stream was made to form $U_3O_8$ and, subsequently, by heating to more than 800° C. with the atmosphere changed to hydrogen, was reduced to $UO_2$. After repeating the above process three times, the pellet was completely pulverized and activated to such an extent as was readily soluble in nitric acid.

*Example 2*

The process of Example 1 was applied to uranium metal and uranium carbide pellets, the other uranium compounds, and they were more readily pulverized and activated than in the case of $UO_2$.

*Example 3*

The 1 g. of pulverized $UO_2$ produced by means of the processes of Examples 1 and 2 was mixed with nitrate of TOA (or TLA or CHDLA) 4 g. into paste form. This was fed into a small-size ball mill, where the $UO_2$ was further pulverized and, simultaneously, the leaching of plutonium with amine with amine nitrate was effected.

20 g. of kerosene, to which octyl alcohol had been added to the extent of 10 vol. percent, was added to the paste produced in the ball mill, the mixture being stirred, and thereby the plutonium amine nitrate was diluted and dissolved in the kerosene phase. In this example, 70~80% of the plutonium contained in the $UO_2$ was leached into the organic phase and $UO_2$ and fission products remained in the residue.

*Example 4*

Nitrate of TOA (or TLA or CHDLA) 10 ml., diluted to 20 vol. percent with kerosene to which octyl alcohol had been added, to the extent of 10 vol. percent, was added to 0.5 g. of the pulverized $UO_2$ produced by the processes of Examples 1 and 2, and the mixture was stirred in a beaker with an electric stirrer; plutonium was leached at 40~50% in 3 hours.

*Example 5*

6 ml. of 1 M oxalic acid was added to 10 ml. of amine/kerosene solvent which contains the plutonium obtained in Examples 3 and 4, and the mixture was stirred; 95% of plutonium was recovered as a direct precipitate of plutonium oxalate in stripping from the organic phase.

What we claim is:

A method for the direct separation and recovery of plutonium from irradiated nuclear fuel consisting of uranium and plutonium compounds which comprises oxidizing uranium in said fuel to $U_3O_8$ by use of oxygen, followed by reducing said $U_3O_8$ to $UO_2$ by hydrogen in a number of repeated cycles sufficient to pulverize and activate said fuel without dissolving it, selectively leaching the plutonium with an organic solvent selected from the group consisting of trioctylamine, trilaurylamine and cyclohexyldilaurylamine, each diluted with kerosene containing octylalcohol while simultaneously pulverizing in a ball mill to keep the fuel surface fresh for leaching, and then directly precipitating the plutonium retained in the organic phase by stripping with an oxalic acid solution.

References Cited

UNITED STATES PATENTS 3,154,377   10/1964   Chesne _____ 23—340

FOREIGN PATENTS 834,531   5/1960   Great Britain.

OTHER REFERENCES

Coleman et al: Amine Salts as Solvent Extraction Reagents for Uranium and Other Metals, Int. Conf. on the Prace, Uses of Atomic Energy, 1958, vol. 28, pp. 278–287.

CARL D. QUARFORTH, *Primary Examiner.*

BENJAMIN R. PADGETT, L. DEWAYNE RUTLEDGE, *Examiners.*

S. TRAUB, *Assistant Examiner.*